United States Patent
Leinonen et al.

(10) Patent No.: US 9,612,991 B2
(45) Date of Patent: Apr. 4, 2017

(54) CONNECTOR INTERFACE PIN MAPPING

(71) Applicant: Nokia Corporation, Espoo (FI)

(72) Inventors: Pekka E. Leinonen, Turku (FI); Kai Inha, Jarvenpaa (FI); Timo T. Toivola, Turku (FI); Pekka Talmola, Turku (FI); Rune Lindholm, Sottunga (FI); Timo J. Toivanen, Mantsala (FI)

(73) Assignee: Nokia Technologies Oy, Espoo (FI)

( * ) Notice: Subject to any disclaimer, the term of this patent is extended or adjusted under 35 U.S.C. 154(b) by 316 days.

(21) Appl. No.: 14/050,961

(22) Filed: Oct. 10, 2013

(65) Prior Publication Data

US 2015/0106544 A1 Apr. 16, 2015

(51) Int. Cl.
  G06F 13/20 (2006.01)
  G06F 3/00 (2006.01)
  G06F 13/40 (2006.01)
  G06F 13/42 (2006.01)

(52) U.S. Cl.
  CPC ...... *G06F 13/4081* (2013.01); *G06F 13/4265* (2013.01)

(58) Field of Classification Search
  None
  See application file for complete search history.

(56) References Cited

U.S. PATENT DOCUMENTS

| | | |
|---|---|---|
| 5,295,843 A | 3/1994 | Davis et al. |
| 5,835,791 A | 11/1998 | Goff et al. |
| 6,222,910 B1 | 4/2001 | Price et al. |
| 6,630,747 B1 | 10/2003 | Kamada et al. |
| 7,361,059 B2 | 4/2008 | Harkabi et al. |
| 7,387,539 B2 | 6/2008 | Trenne |
| 7,440,287 B1 | 10/2008 | Ni et al. |
| 7,493,437 B1 | 2/2009 | Jones et al. |
| 7,865,629 B1 | 1/2011 | Tantos et al. |
| 8,043,099 B1 | 10/2011 | Ni et al. |
| 8,057,106 B1 | 11/2011 | Zhovnirovsky et al. |

(Continued)

FOREIGN PATENT DOCUMENTS

| EP | 1487081 A2 | 12/2004 |
|---|---|---|
| EP | 2264611 A1 | 12/2010 |

(Continued)

OTHER PUBLICATIONS

Universal Serial Bus 3.0 Specification.
(Continued)

*Primary Examiner* — David E Martinez
(74) *Attorney, Agent, or Firm* — Mintz Levin Cohn Ferris Glovsky and Popeo, P.C.

(57) ABSTRACT

Methods and apparatus, including computer program products, are provided for connector interface mapping. In one aspect there is provided a method. The method may include detecting, at a first device, an orientation of a data connector connectable to a data interface, the data interface having a first portion and a second portion, the first portion coupled to a single port of a first type at the first device; sending, by the first device, the detected orientation information to a second device; and receiving, at the first device including the single port, data sent by the second device to the single port. Related apparatus, systems, methods, and articles are also described.

23 Claims, 4 Drawing Sheets

(56) References Cited

U.S. PATENT DOCUMENTS

| | | |
|---|---|---|
| 8,882,524 B2 | 11/2014 | Golko et al. |
| 8,911,260 B2 | 12/2014 | Golko et al. |
| 2002/0049887 A1 | 4/2002 | Takahashi |
| 2002/0169915 A1 | 11/2002 | Wu |
| 2003/0172318 A1 | 9/2003 | Sugita et al. |
| 2006/0024997 A1 | 2/2006 | Teicher |
| 2006/0076977 A1 | 4/2006 | Zhu |
| 2007/0241769 A1 | 10/2007 | Song et al. |
| 2007/0243769 A1 | 10/2007 | Atsmon et al. |
| 2008/0076301 A1 | 3/2008 | Liu |
| 2008/0215765 A1 | 9/2008 | Butler et al. |
| 2011/0136381 A1 | 6/2011 | Cho |
| 2012/0159008 A1 | 6/2012 | Park et al. |
| 2012/0290761 A1 | 11/2012 | Chen et al. |
| 2013/0029527 A1 | 1/2013 | Mullins |
| 2013/0080801 A1 | 3/2013 | Choi et al. |
| 2013/0108065 A1 | 5/2013 | Mullins et al. |
| 2013/0117470 A1* | 5/2013 | Terlizzi .............. H01R 13/6683 710/3 |
| 2013/0305066 A1 | 11/2013 | Mullins et al. |
| 2014/0073188 A1 | 3/2014 | Fritchman et al. |
| 2014/0075069 A1 | 3/2014 | Mullins et al. |
| 2014/0129740 A1 | 5/2014 | Wang et al. |
| 2014/0206209 A1 | 7/2014 | Kamei et al. |
| 2014/0208134 A1 | 7/2014 | Waters et al. |
| 2014/0280960 A1* | 9/2014 | Paramasivam ......... H04L 47/70 709/226 |
| 2015/0255933 A1 | 9/2015 | Sung et al. |
| 2015/0356045 A1 | 12/2015 | Soffer |

FOREIGN PATENT DOCUMENTS

| | | |
|---|---|---|
| EP | 2381571 A2 | 10/2011 |
| EP | 2590274 A2 | 5/2013 |
| JP | 2002007010 A | 1/2002 |
| JP | 2002312085 A | 10/2002 |
| JP | 2006068396 A | 3/2006 |

OTHER PUBLICATIONS

Universal Serial Bus 3.1 Specification.
USB Battery Charging Specification V1.2 Compliance Plan, Revision 1.0, Oct. 12, 2011.

* cited by examiner

CONNECTOR INTERFACE PIN MAPPING

FIELD

The subject matter described herein relates to connector mapping including Universal Serial Bus (USB) connector mapping.

BACKGROUND

Physical connectors, such as the connector used with the Universal Serial Bus (USB), can be used to couple devices. USB standards define physical and electrical aspects of USB. Examples of those standards include Universal Serial Bus 3.1 Specification, Universal Serial Bus 3.0 Specification, and any additions, revisions, and updates thereto.

SUMMARY

Methods and apparatus, including computer program products, are provided for connector interface mapping.

In some example embodiments, there is a method. The method may include detecting, at a first device, an orientation of a data connector connectable to a data interface, the data interface having a first portion and a second portion, the first portion coupled to a single port of a first type at the first device; sending, by the first device, the detected orientation information to a second device; and receiving, at the first device including the single port, data sent by the second device to the single port.

In some variations, one or more of the features disclosed herein including the following features can optionally be included in any feasible combination. The data interface may include at least one of a universal serial bus plug and a universal serial bus receptacle. The orientation information may represents whether the data connector is in a first orientation or a second orientation rotated by about 180 degrees. The data interface may include at least two communication control pins and, wherein the detecting the orientation information may include determining that the data connector is in the first orientation, in response to detecting a current at a first communication control pin and determining that the data connector is in the second orientation, in response to detecting a current at a second communication control pin. The first portion and the second portion may be positioned symmetrically, wherein when the data connector is in the first orientation, the single port is connected to a first connector portion of the first type, and when the data connector is in the first orientation, the single port is connected to a second connector portion of the first type. The orientation information may be sent through one of the communication control pins. The data interface may include at least one second port of a second type. The orientation information may be sent by the second port. The single port of the first type may be a universal serial bus 3.0 port and the second port of the second type may be a universal serial bus 2.0 port. The second device may include a plurality of ports of the first type and the orientation information enables the second device to select one of the plurality of ports to couple to the first portion and the single port at the first device.

In some example embodiments, a method may include receiving, by a device, orientation information from another device, the orientation information representative of an orientation of a data connector coupled to the other device; selecting, by the device based on the received orientation information, one of a plurality of ports of a first type connected to a data interface; and sending, by the device, data to the selected one of the ports.

In some variations, one or more of the features disclosed herein including the following features can optionally be included in any feasible combination. The device may detect an orientation of a plug connected into the data interface. The data interface may include a universal serial bus receptacle, and the plug may include a universal serial bus plug. The selecting may further include selecting one of the plurality of ports based on the received orientation information and the detected orientation information. The single port of the first type may be a universal serial bus 3.0 port. The received orientation information may represent whether the data connector is in a first orientation or a second orientation rotated by about 180 degrees. The data interface may include at least two communication control pins, at least one of the communication control pins located in a first row of the data interface, and at least another of the communication control pins located in a second row of the data interface.

The above-noted aspects and features may be implemented in systems, apparatus, methods, and/or articles depending on the desired configuration. The details of one or more variations of the subject matter described herein are set forth in the accompanying drawings and the description below. Features and advantages of the subject matter described herein will be apparent from the description and drawings, and from the claims.

Figure 1:
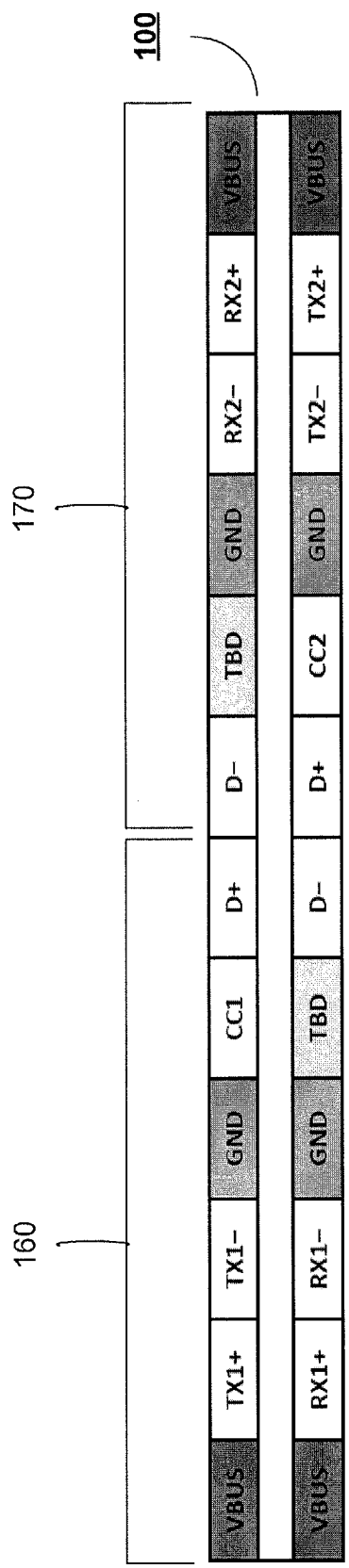
FIG. 1 depicts an example connector.

Like labels are used to refer to same or similar items in the drawings.

DETAILED DESCRIPTION

In some example embodiments, there is provided a type of data connector as depicted in FIG. 1. The connector may comprise a single, small-sized connector, such as a universal serial bus (USB) connector, that can be swapped, so that an end-user does not need to be concerned with the whether the connector is connected to a host or a slave device or in which way the connector plug is inserted to a receptacle.

A USB connector may be implemented, as depicted at FIG. 1, so that there is one USB3.0 bus at either end of the connector which can be used to couple to a USB host device or a USB slave device. Moreover, the connector can be rotated or twisted and still be compatible with a mated receptacle. This differs from prior USB connectors having physically different host connectors and slave connectors. Although a device may have a dual-row connector or receptacle as shown at FIG. 1, some devices may choose to implement only a portion of the dual-row receptacle. Moreover, even though a device may fully implement the receptacle, only some portions of the receptacle may be connected to the appropriate functional blocks in the device, such as for example a USB 3.0 port. For example, a device, such as a USB charger or other device, may include a USB receptacle as shown at FIG. 1, but the receptacle 100 may only use the upper row of the receptacle 100, but not the lower row (or vice versa). When this is the case, a host may not be able to use the Communication Control (CC) pins, such as CC1 and CC2, to perform communications control signaling, orientation detection, and/or communications, such as serial data communications.

The subject matter disclosed herein relates to a device providing to another device USB-plug orientation information. This orientation information may then be used by the other device to select an active port, such as a USB 3.0 port and the like. The other device may also consider its own connector orientation before selecting the active port.

Figure 2:
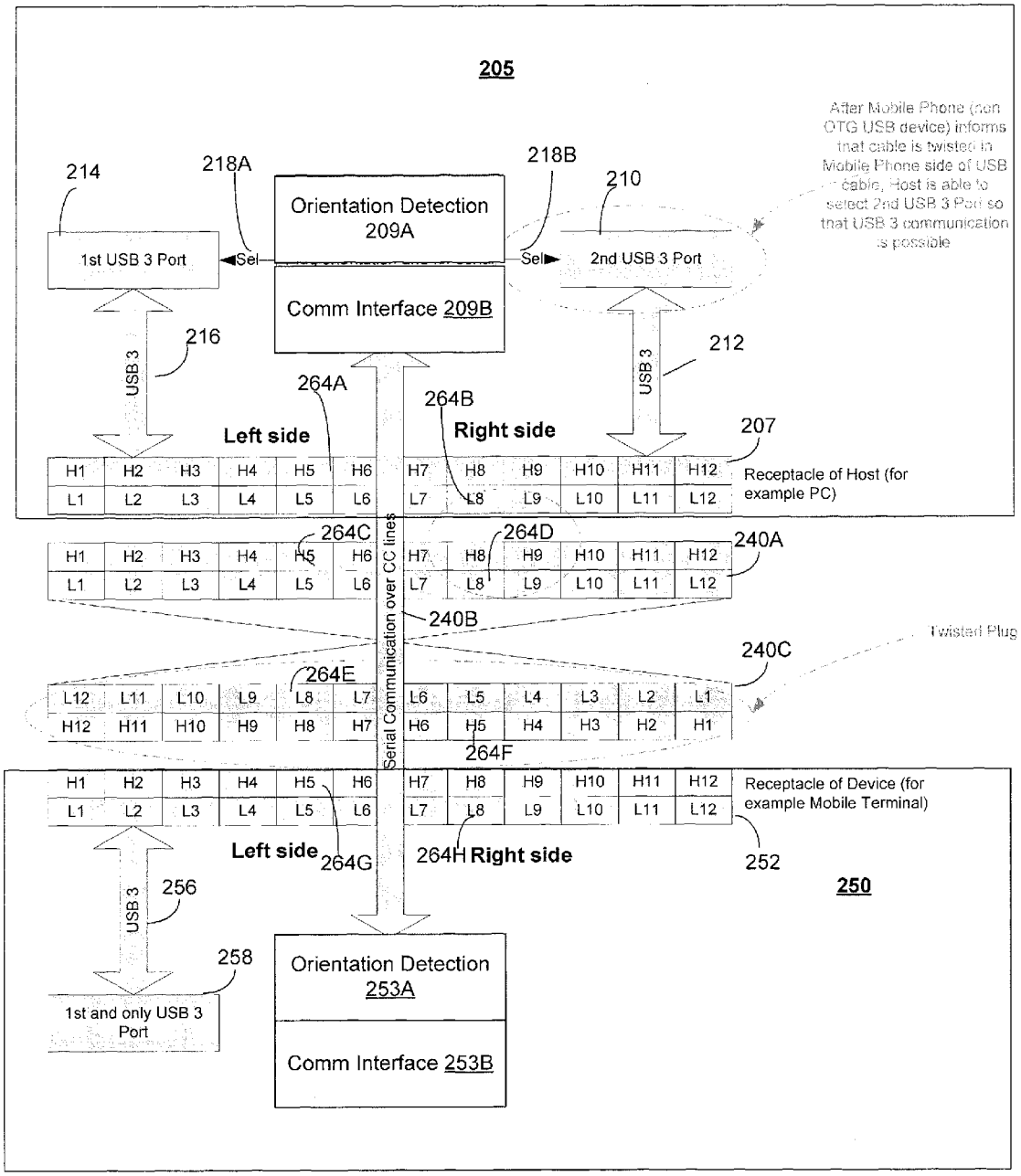
FIG. 2 depicts an example of a system 200 configured to detect the orientation of a connector or to select a port over which to communicate, in accordance with some exemplary embodiments.

FIG. 2 depicts an example of a system 200 including a first device 205 and a second device 250, in accordance with some example embodiments.

In some example embodiments, device 205 may have the capability to communicate using both USB 3.0 ports/lanes but as device 250 has only one USB 3.0 port/lane connected to a portion of the connector, device 205 is configured to select which port/lane is to be used at device 205 to enable communications.

First device 205 may be implemented as a host USB device including two USB ports, such as USB 3.0 ports 210 and 214. The first USB 3.0 port 214 may be coupled 216 to the left portion of the receptacle 207, while the second USB 3.0 port 210 may be coupled 212 to the right portion of the receptacle 207. The first device 205 may also include orientation detection circuitry 209A for detecting the orientation of USB connectors 240A and 240C. For example, orientation detection circuitry 209A may detect connector orientation based on the polarity of a CC line(s), a change in current in a CC line(s), a resistive value at a CC line(s), or a voltage state of a CC line(s) when connected, and the like. The first device 205 may also include a communication interface 209B for communicating over the CC pins/lines (or any other pin/lines) to the second device 205. The ports 214 and 210 may be implemented as data ports in accordance with USB 3.0, although other types of ports may be used as well.

Although first device 205 depicts two USB 3.0 ports 210 and 214, other quantities may be implemented as well. For example, a single USB 3.0 port 210 may be implemented with a multiplexer to provide USB 3.0 connectivity to 212 and 216.

Furthermore, although USB and USB 3.0 is described, the connector mapping subject matter disclosed herein is not limited to USB and USB 3.0 and can thus be used in other frameworks as well.

Second device 250 may be implemented as a USB device but only include a single USB 3.0 port 258 coupled 256 to only the left or right side of the receptacle 252. In the example of FIG. 2, USB 3.0 port 258 is coupled to the left side of receptacle 252. The second device 250 may also include orientation detection circuitry 253A for detecting the orientation of USB connectors. The second device 250 may also include a communication interface 253B for communicating over the CC pins/lines (or any other pin/line) to the first device 205.

Figure 3:
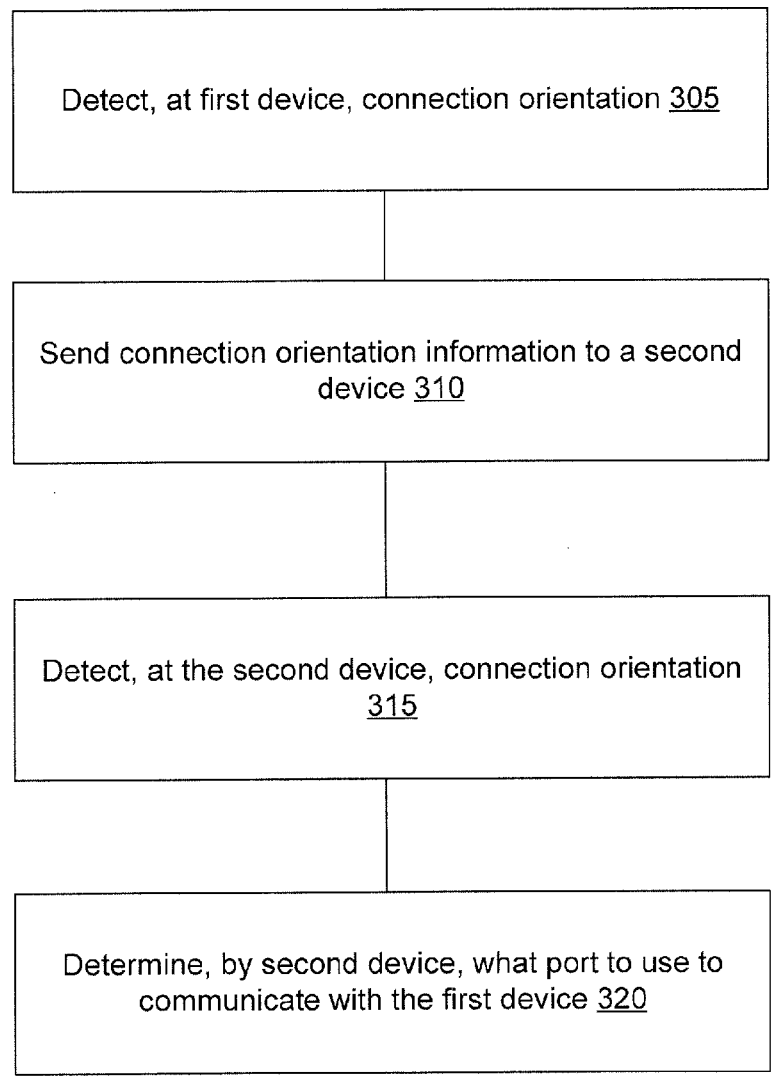
FIG. 3 depicts an example of a process 300 for detecting the orientation of a connector or selecting a port over which to communicate, in accordance with some exemplary embodiments.

FIG. 3 depicts a process 300 for connector mapping, in accordance with some example embodiments. The description of FIG. 3 also refers to FIG. 2.

At 305, a connector orientation may be detected, in accordance with some example embodiments. For example, orientation detection circuitry 253A may determine the orientation of connector 240A, cable 240B, and/or connector 240C. The orientation may be determined based on the CC pins (for example, based on polarity of pins and the like as noted above). In the example of FIG. 2, the connector 240C is twisted, so orientation detection circuitry 253A may detect the twist (for example, rotated by 180 degrees from an untwisted connection) based on the CC1 pins and CC2 pins. For example, if receptacle 207 carries CC1 264A and CC2 264B, connector 240A would accept CC1 264C and CC2 264D as shown. But due to the twist, connector 240C provides CC2 264E on the left side and CC1 264F on the right side. Only CC1 is wired through the cable in the example of FIG. 2. When coupled to receptacle 252, CC2 264G appears on the left side, and CC1 264H appears on the right. In this example, orientation detection circuitry 253A detects (for example, based on the polarity of) CC2 at 264G.

At 310, the detected orientation may be provided to another device, in accordance with some example embodiments. For example, device 250 including communication interface 253B may send the detected orientation information to device 205. The communication interface 253B may send the orientation information via CC lines to device 205. For example, the communication interface 253B may send this orientation (or polarity) information via a serial data line carried by one of the USB lines, such as the CC lines and the like. The orientation information may also be sent to device 205 via one or more of the following: USB 2.0 by for example a USB descriptor containing the orientation/polarity information; and/or power delivery (PD) communications; or other communications paths (for example, a Bluetooth link between devices 205 and 250, a WiFi between devices 205 and 250, and/or the like). The orientation information may also be received via a user interface (for example, entered via a browser, keypad, and the like).

At 315, device 205 may detect its own connector orientation, in accordance with some example embodiments. For example, device 205 may detect its orientation (for example, based on the CC lines/pins) with respect to connector 240A and receptacle 207. In the example of FIG. 3, connector 240A is not twisted, so the orientation of connector 240 may be detected accordingly.

At 320, the device 205 may determine what port to use, in accordance with some example embodiments. For example, device 205 may receive the orientation information for connector 240C sent at 310. Based on the orientation information for connector 240C and/or the determined orientation of connector 240A, device 205 may determine which of the two ports 210 and 214 to use. The orientation detection 209A may then send a corresponding control signal at 218A and/or 218B to activate the selected port 210 or 214. In the example of FIG. 3, device 205 may select a port, such as port 210 as that port traverses the right portion of receptacle 207, the right portion of connector 240A, cable 240B, twisted connector 240C, and (as a result of the twist/change in orientation) the left portion of receptacle 252, where the USB port 258 is coupled 256. Suppose however, that connector 252 were not twisted. If that were the case, device 205 may instead select port 214 as that port traverses the left portion of receptacle 207, the left portion of connector 240A, cable 240B, connector 240C (which is not in a twisted orientation), and the left portion of receptacle 252, where the USB port 258 is coupled.

After the port is selected, the first and second device may communicate (for example, exchange data and the like) between ports at device 205 and 250.

In some example embodiments, device 205 may be configured to automatically swap ports 214 and 210 based of the detection of certain device types and then establish a connection without any negotiations.

Figure 4:
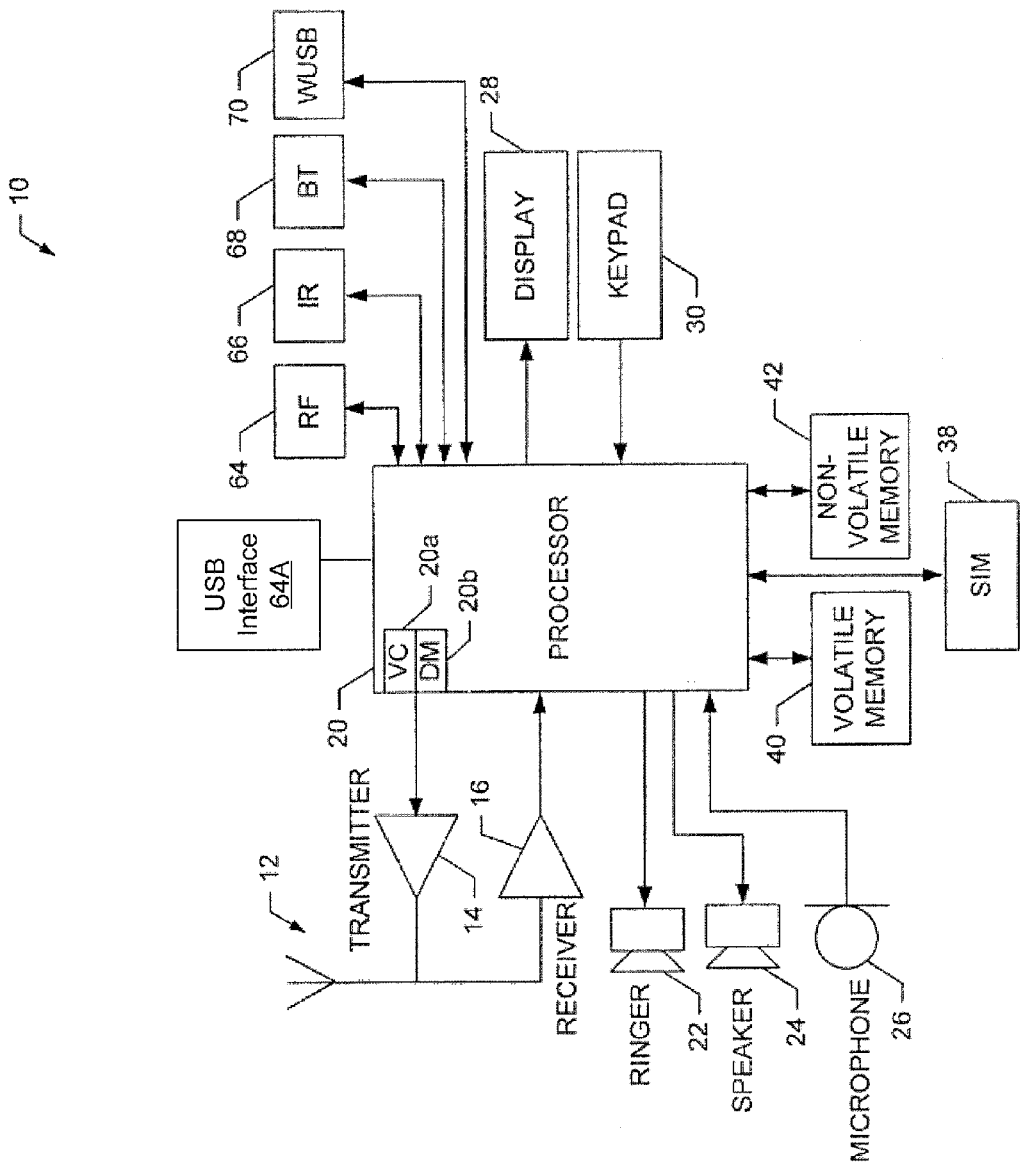
FIG. 4 depicts an example of an apparatus, in accordance with some example embodiments.

FIG. 4 illustrates a block diagram of an apparatus 10, which can be configured as user equipment, in accordance with some example embodiments.

The apparatus 10 further includes a USB interface 64A, which may include one or more of the aspects described with respect to FIG. 2, such as the orientation detection, communication interface, ports, and the like.

The apparatus 10 may include at least one antenna 12 in communication with a transmitter 14 and a receiver 16. Alternatively transmit and receive antennas may be separate.

The apparatus 10 may also include a processor 20 configured to provide signals to and receive signals from the transmitter and receiver, respectively, and to control the functioning of the apparatus. Processor 20 may be configured to control the functioning of the transmitter and receiver by effecting control signaling via electrical leads to the transmitter and receiver. Likewise processor 20 may be configured to control other elements of apparatus 10 by effecting control signaling via electrical leads connecting processor 20 to the other elements, such as for example a display or a memory. The processor 20 may, for example, be embodied in a variety of ways including circuitry, at least one processing core, one or more microprocessors with accompanying digital signal processor(s), one or more processor(s) without an accompanying digital signal processor, one or more coprocessors, one or more multi-core processors, one or more controllers, processing circuitry, one or more computers, various other processing elements including integrated circuits (for example, an application specific integrated circuit (ASIC), a field programmable gate array (FPGA), and/or the like), or some combination thereof. Apparatus 10 may include a location processor and/or an interface to obtain location information, such as positioning and/or navigation information. Accordingly, although illustrated in FIG. 3 as a single processor, in some example embodiments the processor 20 may comprise a plurality of processors or processing cores.

Signals sent and received by the processor 20 may include signaling information in accordance with an air interface standard of an applicable cellular system, and/or any number of different wireline or wireless networking techniques, comprising but not limited to Wi-Fi, wireless local access network (WLAN) techniques, such as for example, Institute of Electrical and Electronics Engineers (IEEE) 802.11, 802.16, and/or the like. In addition, these signals may include speech data, user generated data, user requested data, and/or the like.

The apparatus 10 may be capable of operating with one or more air interface standards, communication protocols, modulation types, access types, and/or the like. For example, the apparatus 10 and/or a cellular modem therein may be capable of operating in accordance with various first generation (1G) communication protocols, second generation (2G or 2.5G) communication protocols, third-generation (3G) communication protocols, fourth-generation (4G) communication protocols, Internet Protocol Multimedia Subsystem (IMS) communication protocols (for example, session initiation protocol (SIP) and/or the like. For example, the apparatus 10 may be capable of operating in accordance with 2G wireless communication protocols IS-136, Time Division Multiple Access TDMA, Global System for Mobile communications, GSM, IS-95, Code Division Multiple Access, CDMA, and/or the like. In addition, for example, the apparatus 10 may be capable of operating in accordance with 2.5G wireless communication protocols General Packet Radio Service (GPRS), Enhanced Data GSM Environment (EDGE), and/or the like. Further, for example, the apparatus 10 may be capable of operating in accordance with 3G wireless communication protocols, such as for example, Universal Mobile Telecommunications System (UMTS), Code Division Multiple Access 2000 (CDMA2000), Wideband Code Division Multiple Access (WCDMA), Time Division-Synchronous Code Division Multiple Access (TD-SCDMA), and/or the like. The apparatus 10 may be additionally capable of operating in accordance with 3.9G wireless communication protocols, such as for example, Long Term Evolution (LTE), Evolved Universal Terrestrial Radio Access Network (E-UTRAN), and/or the like. Additionally, for example, the apparatus 10 may be capable of operating in accordance with 4G wireless communication protocols, such as for example LTE Advanced and/or the like as well as similar wireless communication protocols that may be subsequently developed.

It is understood that the processor 20 may include circuitry for implementing audio/video and logic functions of apparatus 10. For example, the processor 20 may comprise a digital signal processor device, a microprocessor device, an analog-to-digital converter, a digital-to-analog converter, and/or the like. Control and signal processing functions of the apparatus 10 may be allocated between these devices according to their respective capabilities. The processor 20 may additionally comprise an internal voice coder (VC) 20a, an internal data modem (DM) 20b, and/or the like. Further, the processor 20 may include functionality to operate one or more software programs, which may be stored in memory. In general, processor 20 and stored software instructions may be configured to cause apparatus 10 to perform actions. For example, processor 20 may be capable of operating a connectivity program, such as for example, a web browser. The connectivity program may allow the apparatus 10 to transmit and receive web content, such as for example location-based content, according to a protocol, such as for example, wireless application protocol, WAP, hypertext transfer protocol, HTTP, and/or the like.

Apparatus 10 may also comprise a user interface including, for example, an earphone or speaker 24, a ringer 22, a microphone 26, a display 28, a user input interface, and/or the like, which may be operationally coupled to the processor 20. The display 28 may, as noted above, include a touch sensitive display, where a user may touch and/or gesture to make selections, enter values, and/or the like. The processor 20 may also include user interface circuitry configured to control at least some functions of one or more elements of the user interface, such as for example, the speaker 24, the ringer 22, the microphone 26, the display 28, and/or the like. The processor 20 and/or user interface circuitry comprising the processor 20 may be configured to control one or more functions of one or more elements of the user interface through computer program instructions, for example, software and/or firmware, stored on a memory accessible to the processor 20, for example, volatile memory 40, non-volatile memory 42, and/or the like. The apparatus 10 may include a battery for powering various circuits related to the mobile terminal, for example, a circuit to provide mechanical vibration as a detectable output. The user input interface may comprise devices allowing the apparatus 20 to receive data, such as for example, a keypad 30 (which can be a virtual keyboard presented on display 28 or an externally coupled keyboard) and/or other input devices.

Moreover, the apparatus 10 may include a short-range radio frequency (RF) transceiver and/or interrogator 64, so data may be shared with and/or obtained from electronic devices in accordance with RF techniques. The apparatus 10 may include other short-range transceivers, such as for example an infrared (IR) transceiver 66, a Bluetooth (BT) transceiver 68 operating using Bluetooth wireless technology, a wireless universal serial bus (USB) transceiver 70, and/or the like. The Bluetooth transceiver 68 may be capable of operating according to low power or ultra-low power Bluetooth technology, for example, Wibree, radio standards. In this regard, the apparatus 10 and, in particular, the short-range transceiver may be capable of transmitting data to and/or receiving data from electronic devices within a proximity of the apparatus, such as for example within 10 meters. The apparatus 10 including the WiFi or wireless local area networking modem may also be capable of transmitting and/or receiving data from electronic devices according to various wireless networking techniques, including 6LoWpan, Wi-Fi, Wi-Fi low power, WLAN techniques such as for example IEEE 802.11 techniques, IEEE 802.15 techniques, IEEE 802.16 techniques, and/or the like.

The apparatus 10 may comprise memory, such as for example, a subscriber identity module (SIM) 38, a removable user identity module (R-UIM), and/or the like, which may store information elements related to a mobile subscriber. In addition to the SIM, the apparatus 10 may include other removable and/or fixed memory. The apparatus 10 may include volatile memory 40 and/or non-volatile memory 42. For example, volatile memory 40 may include Random Access Memory (RAM) including dynamic and/or static RAM, on-chip or off-chip cache memory, and/or the like. Non-volatile memory 42, which may be embedded and/or removable, may include, for example, read-only memory, flash memory, magnetic storage devices, for example, hard disks, floppy disk drives, magnetic tape, optical disc drives and/or media, non-volatile random access memory (NVRAM), and/or the like. Like volatile memory 40, non-volatile memory 42 may include a cache area for temporary storage of data. At least part of the volatile and/or non-volatile memory may be embedded in processor 20. The memories may store one or more software programs, instructions, pieces of information, data, and/or the like which may be used by the apparatus for performing functions of the user equipment/mobile terminal. The memories may comprise an identifier, such as for example an international mobile equipment identification (IMEI) code, capable of uniquely identifying apparatus 10. The functions may include one or more of the operations disclosed herein with respect to the user equipment, such as for example the functions disclosed at process 300. The memories may comprise an identifier, such as for example, an international mobile equipment identification (IMEI) code, capable of uniquely identifying apparatus 10. In the example embodiment, the processor 20 may be configured using computer code stored at memory 40 and/or 42 to for example control one or more aspects of device 205 and/or device 250 including aspects of process 300, and/or the like as disclosed herein.

Some of the embodiments disclosed herein may be implemented in software, hardware, application logic, or a combination of software, hardware, and application logic. The software, application logic, and/or hardware may reside on memory 40, the control apparatus 20, or electronic components, for example. In some example embodiment, the application logic, software or an instruction set is maintained on any one of various conventional computer-readable media. In the context of this document, a "computer-readable medium" may be any non-transitory media that can contain, store, communicate, propagate or transport the instructions for use by or in connection with an instruction execution system, apparatus, or device, such as for example a computer or data processor circuitry, with examples depicted at FIG. 4. A computer-readable medium may comprise a non-transitory computer-readable storage medium that may be any media that can contain or store the instructions for use by or in connection with an instruction execution system, apparatus, or device, such as for example a computer. Furthermore, some of the embodiments disclosed herein include computer programs configured to cause methods as disclosed herein (see, for example, process 300 and/or the like).

Without in any way limiting the scope, interpretation, or application of the claims appearing below, a technical effect of one or more of the example embodiments disclosed herein is chipsets in devices having only a single port can operate with dual ported hosts.

If desired, the different functions discussed herein may be performed in a different order and/or concurrently with each other. Furthermore, if desired, one or more of the above-described functions may be optional or may be combined. Although various aspects of the invention are set out in the independent claims, other aspects of the invention comprise other combinations of features from the described embodiments and/or the dependent claims with the features of the independent claims, and not solely the combinations explicitly set out in the claims. It is also noted herein that while the above describes example embodiments, these descriptions should not be viewed in a limiting sense. Rather, there are several variations and modifications that may be made without departing from the scope of the present invention as defined in the appended claims. Other embodiments may be within the scope of the following claims. The term "based on" includes "based on at least."

What is claimed:

1. A method comprising:
    detecting, at a first device, an orientation of a data connector connectable to a data interface, the data interface having a first portion and a second portion, the first portion coupled to a single port of a first type at the first device;
    sending, by the first device and in response to the detecting of the orientation of the data connector, the detected orientation information to a second device; and
    receiving, at the first device including the single port, data sent by the second device to the single port.

2. The method of claim 1, wherein the data interface comprises at least one of a universal serial bus plug and a universal serial bus receptacle.

3. The method of claim 1, wherein the orientation information represents whether the data connector is in a first orientation or a second orientation rotated by 180 degrees.

4. The method of claim 3, wherein the data interface comprises at least two communication control pins and, wherein the detecting the orientation information comprises:
    determining that the data connector is in the first orientation, in response to detecting a current at a first communication control pin; and
    determining that the data connector is in the second orientation, in response to detecting a current at a second communication control pin.

5. The method of claim 4, wherein the orientation information is sent through one of the communication control pins.

6. The method of claim 1, wherein the first portion and the second portion are positioned symmetrically, wherein when the data connector is in the first orientation, the single port is connected to a first connector portion of the first type, and when the data connector is in the first orientation, the single port is connected to a second connector portion of the first type.

7. The method of claim 1, wherein the data interface comprises at least one second port of a second type, and wherein the orientation information is sent by the second port.

8. The method of claim 7, wherein the single port of the first type comprises a universal serial bus 3.0 port and the second port of the second type comprises a universal serial bus 2.0 port.

9. The method of claim 1, wherein the second device comprises a plurality of ports of the first type and the orientation information enables the second device to select one of the plurality of ports to couple to the first portion and the single port at the first device.

10. A method comprising:
  detecting, by a device, an orientation of a first data connector coupled to the device;
  receiving, by the device, orientation information from another device in response to the other device detecting an orientation of a second data connector coupled to the other device, the orientation information representative of the orientation of the second data connector coupled to the other device, wherein the first data connector is in electrical communication with the second data connector;
  selecting, by the device based on the detected orientation information and the received orientation information, one of a plurality of ports of a first type connected to a data interface; and
  sending, by the device, data to the selected one of the ports.

11. The method of claim 10 further comprising:
  detecting, by the device, an orientation of a plug connected into the data interface.

12. The method of claim 11, wherein the data interface comprises a universal serial bus receptacle, and the plug comprises a universal serial bus plug.

13. The method of claim 11, wherein the selecting further comprises:
  selecting one of the plurality of ports based on the received orientation information and the detected orientation information.

14. The method of claim 13, wherein the selected one of the ports comprises a universal serial bus 3.0 port.

15. The method of claim 10, wherein the received orientation information represents whether the data connector is in a first orientation or a second orientation rotated by 180 degrees.

16. The method of claim 15, wherein the data interface comprises at least two communication control pins, at least one of the communication control pins located in a first row of the data interface, and at least another of the communication control pins located in a second row of the data interface.

17. An apparatus comprising:
  detection circuitry configured to at least detect an orientation of a data connector connectable to a data interface, the data interface having a first portion and a second portion, the first portion coupled to a single port of a first type at the first device; and
  communication circuitry configured to at least send, in response to the detection circuitry detecting the orientation of the data connector, the detected orientation information to another device and receive data sent by the other device to the single port.

18. The apparatus of claim 17, wherein the data interface comprises at least one of a universal serial bus plug and a universal serial bus receptacle.

19. The apparatus of claim 17, wherein the first portion and the second portion are positioned symmetrically, wherein when the data connector is in the first orientation, the single port is connected to a first connector portion of the first type, and when the data connector is in the first orientation, the single port is connected to a second connector portion of the first type.

20. An apparatus comprising:
  detection circuitry configured to at least detect an orientation of a first data connector coupled to the device;
  communication circuitry configured to at least receive orientation information from another device in response to the other device detecting an orientation of a second data connector coupled to the other device, the orientation information representative of the orientation of the second data connector coupled to the other device, wherein the first data connector is in electrical communication with the second data connector; and
  selection circuitry configured to at least select, based on the detected orientation information and the received orientation information, one of a plurality of ports of a first type connected to a data interface, wherein the communication circuitry is further configured to at least send data to the selected one of the ports.

21. The apparatus of claim 20, wherein the data interface comprises a universal serial bus receptacle, and the plug comprises a universal serial bus plug.

22. A non-transitory computer-readable medium including computer code which when executed by at least one processor causes operations comprising:
  detecting, at a first device, an orientation of a data connector connectable to a data interface, the data interface having a first portion and a second portion, the first portion coupled to a single port of a first type at the first device;
  sending, by the first device and in response to the detecting of the orientation of the data connector, the detected orientation information to a second device; and
  receiving, at the first device including the single port, data sent by the second device to the single port.

23. A non-transitory computer-readable medium including computer code which when executed by at least one processor causes operations comprising:
  detecting, by a device, an orientation of a first data connector coupled to the device;
  receiving, by the device, orientation information from another device in response to the other device detecting an orientation of a second data connector coupled to the other device, the orientation information representative of the orientation of the second data connector coupled to the other device, wherein the first data connector is in electrical communication with the second data connector;
  selecting, by the device based on the detected orientation information and the received orientation information, one of a plurality of ports of a first type connected to a data interface; and
  sending, by the device, data to the selected one of the ports.

* * * * *